CURTIS E. McCANN
ARCHIE H. RICE
INVENTORS.

BY
BUCKHORN, BLORE, KLARQUIST & SPARKMAN
ATTORNEYS

United States Patent Office 3,615,025
Patented Oct. 26, 1971

3,615,025
SOLIDS-LIQUID SEPARATOR WITH VERTICALLY SPACED TUBE-SETTLERS
Archie H. Rice and Curtis E. McCann, Corvallis, Oreg., assignors to Neptune Microfloc, Incorporated, Corvallis, Oreg.
Filed Dec. 19, 1969, Ser. No. 886,680
Int. Cl. B01d 21/02, 21/24
U.S. Cl. 210—521                                8 Claims

ABSTRACT OF THE DISCLOSURE

Apparatus for removing entrained solids from liquids includes container with inlet in lower position and outlet at top. Two vertically spaced layers of inclined channels are positioned in container so that liquid must flow upwardly through channels of each layer. Separation of layers prevents disturbance from eddy currents or other turbulence in liquid and enhances separation of solids.

BACKGROUND OF THE INVENTION

It has been found in the clarification of water, such as in the treatment of waste water, or in water treatment plants where it is desired to remove large amounts of settleable solids from the water, that such solids can be effectively removed by converging the water with the solids entrained therein upwardly through banks of small diameter tubes inclined at large acute angles. If the flow rate is maintained such that streamline flow exists within the tubes, the solids will deposit on the bottom surfaces of the tubes and slide out the bottom ends while the clarified water flows continuously out of the tops of the tubes. Installations have been made, for example, in large basins wherein the solids carrying water is introduced in the lower portion of the basin and caused to flow upwardly through a layer of the tubes positioned in an upper portion of the basin. However, difficulty has been encountered in some installation because of the turbulent conditions which are encountered within the basin. Such turbulence results in some cases because of the inadequate design of the infeed arrangement of the liquid, but some turbulence results simply because of the inherent flow anomalies that develop in a solids-laden liquid. It will be appreciated that a mixture of water and solids of greater specific gravity than water will have a density that is greater than water itself. Consequently, where nonuniform concentrations of solids exist in a water-solids mixture, there is a tendency for the water-solids mixture having the higher ratio of solids to flow downwardly under the influence of gravity, and this will cause an upward flow of water in another portion of a basin. Such flow anomalies can create currents of rather substantial velocity, and in systems utilizing a layer of settling tubes it has been found that such localized currents sometimes extend through a portion of the tubes carrying turbidity through the tubes without the desired settling.

BRIEF DESCRIPTION OF THE INVENTION

It has been discovered that the problems of turbulence and turbidity carry-through can be attenuated by positioning two banks of inclined tubes or other channel defining means one above the other in a basin with the banks spaced vertically so as to define a plenum between them in which the energy of the high velocity streams of water emerging from portions of the lower bank can be dissipated whereby the water will flow upwardly through the upper bank at a substantially uniform rate throughout the bank.

DRAWINGS

Figure 1:
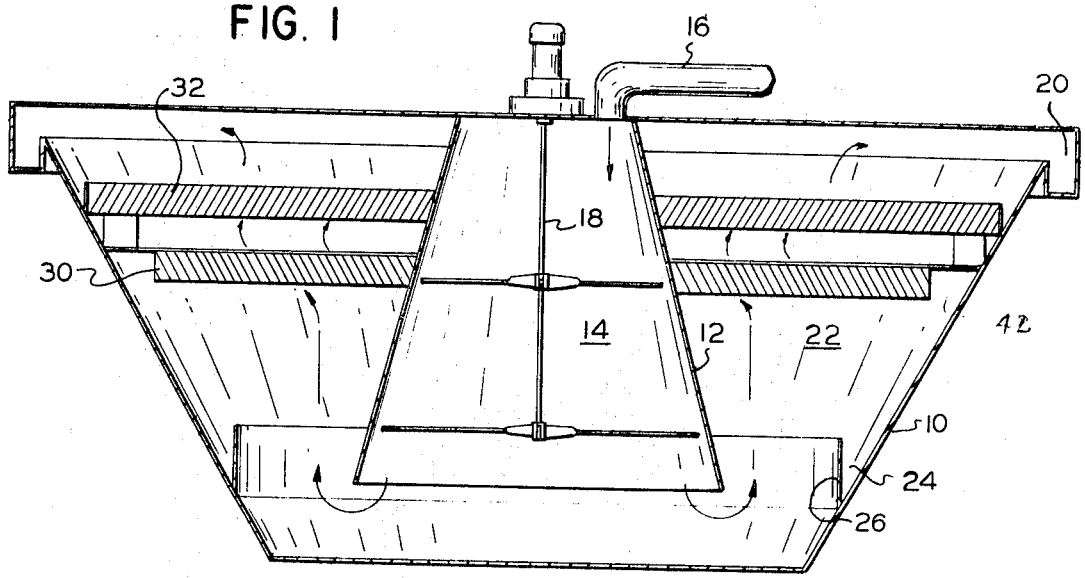
Figure 2:
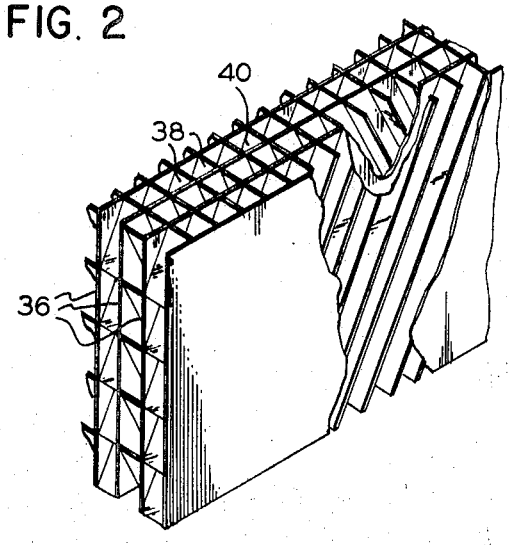

FIG. 1 is a cross-section of a clarifier constructed in accordance with the invention, and
FIG. 2 is a fragmentary perspective view of a section of a bank of tubes adapted for use in the apparatus of the invention.

DETAILED DESCRIPTION OF THE INVENTION

Illustrated in FIG. 1 in a somewhat schematic fashion is a suspended solids contact device of the type which is frequently used in water softening processes. Such a device comprises an outer basin 10 in the form of an inverted, truncated cone. Co-axial with the outer basin 10 is an inner truncated cone 12 which defines a mixing chamber 14 into which the water, to which softening chemicals have previously been added, is introduced at a controlled rate through a suitable inlet indicated here by means of a pipe 16. Suitable mixing means indicated at 18, are provided to agitate the water in the chamber 14. The water is continually fed through the pipe 16 into the chamber 14 and passes outwardly beneath the lower edges of the inner cone 12 into the surrounding space as indicated by the arrows, there being effluent channels 20 provided around the top rim of the cone 10 for collecting the water and carrying it from the softener. In the ordinary operation of such device, the annular zone 22 defined by the cones 10, 12 constitutes a slurry concentrating zone wherein the coagulated hardness imparting materials settle out, and the clarified water flows into the effluent collection channel 20. The precipitating sludge collects within a sludge pocket 24 defined by a vertical wall 26 in the cone 10 and from which pocket the sludge is continually removed by suitable means (not shown).

As will be apparent, the capacity of a device, such as illustrated, is limited in part by the ability to secure separation of the settleable particles within the settling zone or basin 22. If water is introduced into the device at too rapid a rate, the rate of flow upwardly through the zone 22 will prevent suitable settling of the particles. Also, when large concentrations of solids are present, the flow anomalies mentioned previously are likely to occur with formation of eddy currents within the basin which interfere with the settling of the solids.

In accordance with the invention, two vertically spaced settling devices 30, 32 are provided each of which comprises means defining inclined channels through which water may flow upwardly and defining surfaces upon which settled solids may deposit and slide downwardly. Preferably the devices 30, 32 comprise tubes inclined at an angle of between about 45° and 75° to the horizontal and relatively long with respect to their cross-sectional dimension. The tube length may vary from 12 to 48 inches; a preferred length is 24 inches. A preferred cross-sectional area is about four square inches, although the cross-sectional area may vary from between about one square inch to 27 square inches.

Preferably, each layer is made up of parallel rows of inclined tubes with the tubes of one row inclined at a direction opposite to that of the tubes of the adjacent row. The layers are conveniently made up of modules of tubes formed as shown in co-pending U.S. application, Ser. No. 721,250, filed Apr. 15, 1968, now U.S. Pat. No. 3,491,892, issued Jan. 27, 1970.

Referring to FIG. 2, such modules comprise a plurality of parallel vertical sheets 36 of relatively thin but rigid or semi-rigid plastic material. Between adjacent sheets 36 are attached parallel baffles 38 which are inclined in the installed position of the device at an angle of between 45° to 75° to the horizontal. The baffles 38 define with the sheets 36 and conduits or tubes 40 through which the water may flow in an upward direction. The spacing between the sheets 36 and baffles 38 may be varied but in a preferred configuration the conduits 40 are about 2 feet in length and about 2 inches square in cross-section. Preferably the baffles 38 are arranged so that the baffles of adjacent rows are inclined in directions opposite to one another. This has the advantage of forming a rigid, trusslike unit which is adapted to be self-supporting and facilitate its mounting in the clarification device, but in the present invention the opposite inclination of the channels has a further advantage which will be described subsequently.

The modules in the upper layer 32 are mounted with suitable supports so as to cover the entire area of the basin 22 whereby all the water flowing upwardly must pass through the tubes of the upper layer. The modules in the lower layer 30, on the other hand, are arranged so as to provide an annular gap or passageway 42 of a few inches around the periphery of the cone 10 but otherwise completely cover the area between the inner cone 12 and the outer cone 10. The purpose of the gap 42 is to permit solids depositing on the cone 10 to slide downwardly so they can be received within the solids sump 24.

The layers 30, 32 are preferably spaced apart vertically by at least 4 inches, although lesser or more spacing may be desired under certain circumstances. The depth of the plenum between the units 30, 32 to be utilized will depend upon the nature of the materials being handled and the velocity with which the water is being passed through the unit. At higher velocities the water will obviously have more energy to dissipate and a plenum of larger volume, that is, depth, will be desired. As mentioned previously, the alternate inclination of rows of tubes is of advantage other than structural strength, such advantage residing in the fact that the alternately inclined discharge currents create intermixing and rapid dissipation of the energy and elimination of the undesired eddy currents. The maximum flow rate through the unit should be such that at least the upper tube layer, and preferably also the lower layer, can receive the flow therethrough at an average liquid flow rate not exceeding the limits of stream line or laminar flow.

A suspendeded solids contact device such as described is located in the water softening plant of a midwestern city. Prior to modification in accordance with the invention, such clarifier was operating at a throughput of 8½ million gallons per day, the effluent having a turbidity of between 20 and 30 JTU and a hardness of between 65 and 80 parts per million. After modification in accordance with the invention it was possible to operate the apparatus with a through-put of 30 million gallons per day, at the same time securing an effluent turbidity of only 10 JTU and a hardness of 60 parts per million. In such clarifier was mounted an upper layer of settling tube modules wherein the tubes were 24 inches long and two inches square in cross-section and inclined at an angle of 60° to the horizontal. Similar modules were mounted to form a lower layer of tubes with a vertical spacing of two feet between the layers. An annular gap of about two inches was provided between the outer tank wall and the lower edge of the lower tube layer.

Prior to operation with two layers of tubes, it was attempted to operate such clarifier with a single layer of tubes. Operation was unsatisfactory since eddy currents caused a "boil" of solids through some areas of the settling tubes with consequent carry over of such solids into the effluent channel 20. With the addition of the second lower layer of tubes, such boiling at the surface of the upper layer was eliminated even with the threefold increase in the throughput of the clarifier.

While a preferred embodiment of the invention has been described, it will be obvious that the invention permits of modification in arrangement and detail. It will be further obvious that the application of the invention may be made in numerous environments where separation of settleable solids from liquids is desired.

We claim:

1. An apparatus for removing settleable solids from a liquid which comprises:
   a container,
   feed means for feeding solids carrying liquid to the lower portion of said container,
   discharge means adjacent the top of said container for removing liquid therefrom,
   settling means in said container for effecting separation of settleable solids from said liquid positioned between said feed means and said discharge means comprising:
   means defining a first, lower layer of channels inclined to the horizontal at a large acute angle,
   means defining a second, upper layer of channels inclined to the horizontal at a large acute angle,
   said upper layer of channels being spaced from said lower layer of channels to an extent so as to define an unobstructed plenum therebetween which induces intermixing of the liquid streams emerging from said lower layer of channels in a manner so as to dissipate the energy of said streams and thereby promote an even velocity distribution within said plenum and laminar flow within all channels of said upper layer of channels.

2. Apparatus as set forth in claim 1 wherein said first and second layers of channels comprise tubes of small diameter relative to their length.

3. Apparatus as set forth in claim 2 wherein said tubes are inclined at an angle of between 45 degrees and 75 degrees.

4. Apparatus as set forth in claim 2 wherein said feed means feeds said solids carrying liquid to the lower portion of said container at a flow rate not exceeding a predetermined maximum,
   and the total cross-sectional area of said second layer of tubes is sufficient that at the average liquid flow rate through the tubes of such layer such flow would be streamline flow.

5. Apparatus as set forth in claim 2 wherein each layer of tubes has a total cross-sectional area sufficient that at the average liquid flow through the tubes such flow would be of streamline flow.

6. Apparatus as set forth in claim 2 wherein each said layer of tubes comprises parallel rows of tubes, the tubes in a row being parallel, the tubes in adjacent rows being oppositely inclined.

7. Apparatus as set forth in claim 2 wherein said layers of tubes are spaced vertically from one another by at least about four inches.

8. Apparatus as set forth in claim 2 wherein the tubes in each said layer have a length of between about twelve to forty-eight inches and a cross-sectional area of between about one inch and twenty-seven square inches.

References Cited

UNITED STATES PATENTS 2,060,166   11/1936   Bowen _____ 210—521 X

JAMES L. DE CESARE, Primary Examiner

U.S. Cl. X.R.
210—208, 311

UNITED STATES PATENT OFFICE
CERTIFICATE OF CORRECTION

Patent No. 3,615,025           Dated Oct. 26, 1971

Inventor(s) Archie H. Rice and Curtis E. McCann

It is certified that error appears in the above-identified patent and that said Letters Patent are hereby corrected as shown below:

Column, 1, line 28, "fromthe" should be two words -- from the--.
Column, 1, line 29, "converging" should be --conveying--.
Column 4, line 17, "refining" should be --defining--.

Signed and sealed this 29th day of February 1972.

(SEAL)
Attest:

EDWARD M. FLETCHER, JR.              ROBERT GOTTSCHALK
Attesting Officer                    Commissioner of Patents